UNITED STATES PATENT OFFICE.

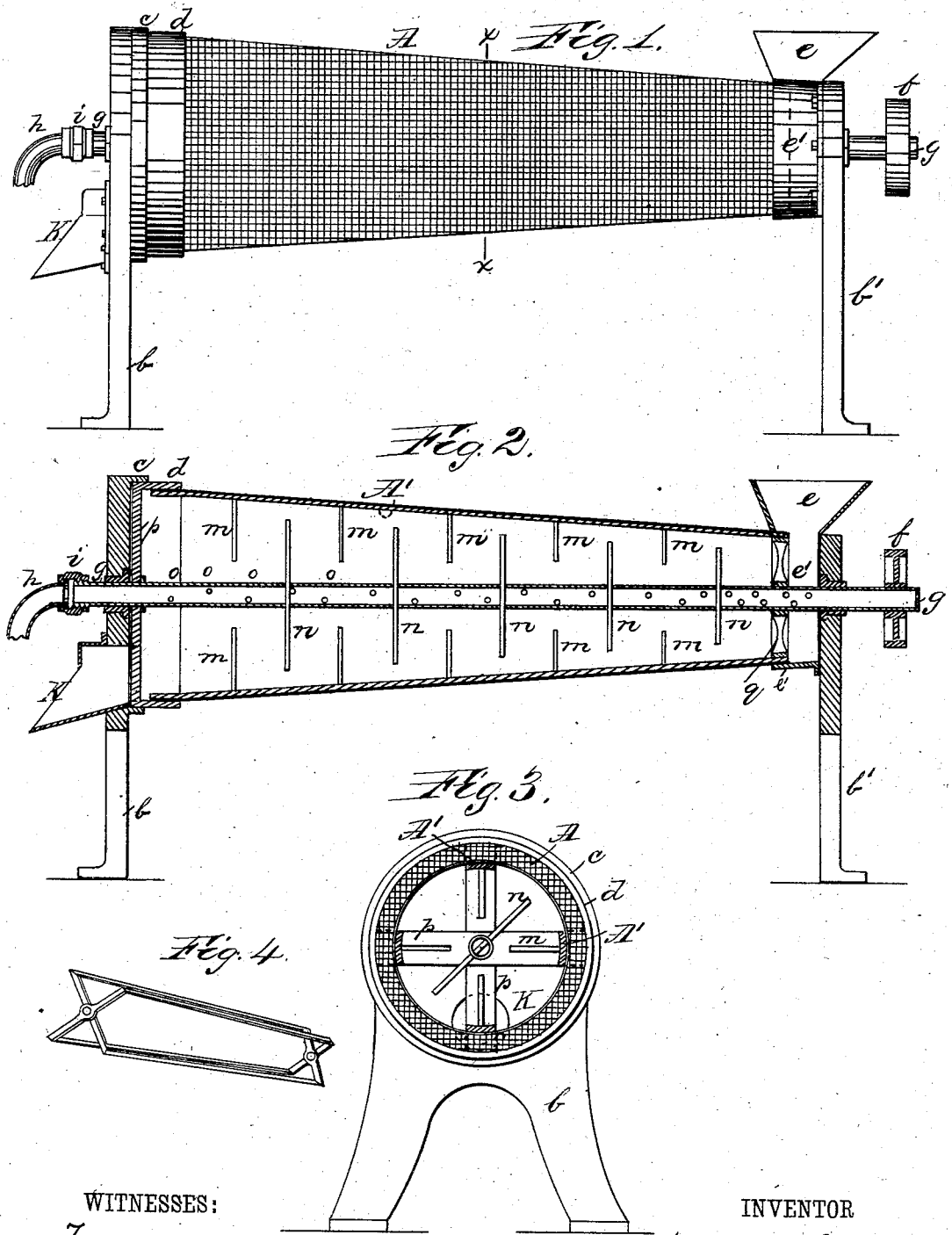

WILLIAM M. DUCKER, OF BROOKLYN, NEW YORK.

MACHINE FOR WASHING CURRANTS.

SPECIFICATION forming part of Letters Patent No. 259,110, dated June 6, 1882.

Application filed March 31, 1882. (No model.)

*To all whom it may concern:*

Be it known that I, WILLIAM M. DUCKER, a citizen of the United States, residing in the city of Brooklyn, county of Kings, and State of New York, have invented certain new and useful Improvements in Machines for Working and Cleaning Currants and other Articles, as hereinafter described, and pointed out in the claim; and I do hereby declare that the following is a full, clear, and exact description of the invention, which will enable others skilled in the art to which it appertains to make and use the same.

My invention is especially applicable to currants, which are used in large quantities by bakers in making up "fruit-biscuits," so called; but of course it may be used by any one, and will be found useful for cleaning and working other articles as well. As currants are procured in the market they form a somewhat compact mass which requires to be broken up, the ends of the stems should be removed, and they should be washed in order to be properly fitted for food. This of course involves a great deal of labor if accomplished by hand. To accomplish this economically I use the machine illustrated in the drawings, in which—

Figure 1 is a side view. Fig. 2 is a longitudinal cross-section. Fig. 3 is a sectional view, looking from the line $x$ $x$ toward the larger end of the sieve; and Fig. 4 is a modified form of the sieve-frame reduced.

A is a tubular sieve or colander provided with independent bearings, and turns upon the hollow shaft $g$, which runs in bearings in the frames $b$ $b'$. The sieve is disposed upon a frame or skeleton, the bars A' of which are attached to a wheel, $d$, of larger diameter, and to a wheel, $q$, of smaller diameter. When so made the wheel $d$ turns partly within the collar or sleeve $c$ and against the side of the frame $b$, which closes this end of the sieve, but permits the contents to discharge between the arms or spokes $p$ of the wheel $d$ through the spout K, by which the articles pass out into a suitable vessel placed for their reception. The part of this wheel not within the collar forms a suitable pulley for the belt to revolve the sieve.

$e$ is a hopper, which is a part of or is fitted onto the collar $e'$. This collar is attached to the inner side of the frame $b'$, and is open at the top, and forms part of the hopper $e$; and into this collar or sleeve $e'$ the other end of the sieve disposed around the wheel $q$ passes for a short distance and revolves within it.

$g$ is a hollow shaft closed or plugged at one end, as shown, and connected to a pipe, $h$, by a swivel-joint, $i$, at the other end. This shaft is pierced at various points with holes $o$, through which the water or other liquid or steam is discharged or forced into the mass to be worked or cleaned. On this shaft are arranged numbers of pins or fingers, $n$, which may be run through the shaft or screwed into it, as desired, and these play between corresponding pins, $m$, attached to the sieve, or to the frame of the sieve.

A convenient frame or skeleton for the sieve is made, as shown, by taking two wheels, $d$ $q$, one of large and one of small diameter, connecting these by a number of bars, A', attached to both, and disposing the sieve over this frame. Another convenient way to make the frame or skeleton is shown in Fig. 4. This is made by bending two bars of proper length, so that the sides will be oblique and the ends perpendicular, one end larger than the other. Slip these one over the other, and at the intersection fasten them together and provide a journal-hole for the shaft $g$, and then arrange the sieve over them and fasten a hoop over the large end for the pulley-belt. A belt over the wheel $d$ turns the sieve in one direction, while another belt on the wheel $q$ turns the shaft $g$ in the opposite direction, and the water is turned on through the pipe $h$.

The method of operation is as follows: I pour into the hopper $e$ the currants or other articles to be cleaned or worked. These pass into the sieve between the arms or spokes of the wheel $q$, and are then whirled around in the sieve, and the mass is thus broken up by the motion of the sieve and the fingers $m$ $n$, and by such motion and attrition the articles are worked or separated, and the stems of the currants are broken off and pass off through the meshes or holes, and any dirt or grit is also worked off by the water at the same time and passes off, while the currants gradually pass down the sieve to the spout K, out of which they fall into the vessel placed there to receive them, freed from grit, dust, and stems, and ready for use.

It will thus be seen that in my machine the articles to be cleaned are introduced and withdrawn while the machine is in motion, and without having to stop the operation, thus saving time and attendance.

In arranging the sieve for work a guard, in the form of an apron of tin or other suitable material, is placed over and down around the sides to prevent the water, &c., from spreading, while a trough or other convenient device is placed beneath the sieve to carry off the water and refuse.

The sieve may be made of an even diameter and tilted, or in any other desired form that will be convenient; but I prefer the form shown in the drawings.

I do not claim broadly a revolving cage with a perforated shaft, as that is not new; but What I do claim as new, and desire to secure by Letters Patent, is—

The machine described, consisting of the cage A, revolving within collars $c$ $e'$ on the frame $b$ $b'$, provided with a hollow perforated shaft, $g$, arranged to revolve in the opposite direction, in combination with the hopper $e$ and spout K, substantially as described.

WILLIAM M. DUCKER.

Witnesses:
W. H. WITHEY, Jr.,
JACOB G. CARPENTER.